United States Patent
Harms et al.

(10) Patent No.: US 7,792,435 B2
(45) Date of Patent: *Sep. 7, 2010

(54) CONTROL DEVICE WITH A SWITCHABLE BANDWIDTH

(75) Inventors: Torsten Harms, Kempen (DE); Stefan van Waasen, Duisburg (DE)

(73) Assignee: Avago Technologies Fiber IP (Singapore) Pte. Ltd., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 12/180,595

(22) Filed: Jul. 28, 2008

(65) Prior Publication Data

US 2008/0278228 A1 Nov. 13, 2008

Related U.S. Application Data

(63) Continuation of application No. 10/817,723, filed on Apr. 2, 2004, now Pat. No. 7,421,213.

(60) Provisional application No. 60/531,011, filed on Dec. 19, 2003.

(51) Int. Cl.
*H04B 10/06* (2006.01)
*H03G 3/20* (2006.01)
*G01J 1/44* (2006.01)
*H04L 27/08* (2006.01)

(52) U.S. Cl. ............. 398/210; 398/209; 250/214 AG; 250/214 C; 375/345

(58) Field of Classification Search ............ 398/209, 398/210; 250/210, 551, 214 AG, 214 C; 375/318, 345

See application file for complete search history.

(56) References Cited

U.S. PATENT DOCUMENTS

| 6,118,399 | A  | * | 9/2000  | Krone ............... 341/150 |
| 6,476,681 | B1 |   | 11/2002 | Kirkpatrick |
| 6,841,771 | B2 | * | 1/2005  | Shimizu ............ 250/214 A |
| 6,952,005 | B2 | * | 10/2005 | Doppke et al. ........ 250/214 R |
| 7,421,213 | B2 | * | 9/2008  | Harms et al. ............ 398/210 |
| 2004/0100317 | A1 |   | 5/2004  | Suzunaga |
| 2005/0047801 | A1 | * | 3/2005  | Schrodinger ........... 398/202 |

FOREIGN PATENT DOCUMENTS

| DE | 19534516 | 3/1996 |
| EP | 0366243  | 5/1990 |
| GB | 2293063  | 3/1996 |

* cited by examiner

*Primary Examiner*—Nathan M Curs

(57) ABSTRACT

A control device with a switchable bandwidth including: an integrating element with a first capacitance, which is charged and discharged by at least one current; at least one second capacitance, which can be connected in parallel with the first capacitance via a first switch; and at least one voltage follower, via which the voltage present at the first capacitance can be fed to the second capacitance. In this case, the first switch is open if the voltage present at the first capacitance is fed to the second capacitance by means of the voltage follower. The first switch is closed if the second capacitance is connected in parallel with the first capacitance. The invention enables a further capacitance to be supplementary connected without a disturbance signal arising.

12 Claims, 2 Drawing Sheets

CONTROL DEVICE WITH A SWITCHABLE BANDWIDTH

RELATED APPLICATION

This application is a continuation patent application of U.S. patent application Ser. No. 10/817,723, entitled "Control Device with a Switchable Bandwidth" and filed Apr. 4, 2004, which claims priority of U.S. Provisional Patent Application Ser. No. 60/531,011 filed by Torsten Harms and Stefan van Wassen on Dec. 19, 2003, each of which are hereby incorporated by reference in their entirety.

FIELD OF THE INVENTION

The invention relates to a control device with a switchable bandwidth. In particular, the invention relates to a control device with a switchable bandwidth which is used in an optical receiver, the control device being part of a control loop for offset control, for controlling the signal amplitude or for controlling the duty cycle.

BACKGROUND OF THE INVENTION

Communications systems with control systems whose bandwidth is switchable are known. Examples of such control systems in communications systems relate to offset compensation, amplitude control and duty cycle control. In this case, different bandwidths which directly adjoin one another with respect to time are often required in different modes. By way of example, it may be expedient to provide a first bandwidth during the transient process of a system under consideration and a second bandwidth after a transient process.

In this case, the intention is to ensure that switching over the bandwidth of the control system generates as few disturbances as possible due to the change in the bandwidth.

In order to switch over the bandwidth in control systems, it is known to switch the bandwidth of an integrating element of the control system. The integrating element is generally realized by a current source, which charges a capacitance. Its bandwidth can be influenced in a simple manner without having to intervene in the actual signal processing parts in the process. Two methods are known for influencing the bandwidth of an integrating element.

Firstly, the bandwidth of an integrating element can be switched over by changing the current which charges or discharges the integrating element. However, switching over the current disadvantageously leads, in the individual circuit parts, to a great change in the operating points and thus to a great disturbance to the control loop.

Furthermore, it is known to change or to switch the size of the capacitance in order to change the bandwidth of an integrating element of a control loop. This does not lead to problems when increasing the bandwidth, i.e. switching out capacitance. However, when reducing the bandwidth, i.e. when supplementarily connecting capacitance, the problem arises that the capacitance that is to be supplementarily connected is not charged to the same voltage as the capacitance already present. This has the effect that a charge equalization between the capacitances is effected at the connection instant. However, the voltage across the capacitance thus disadvantageously changes at the switchover instant, so that a disturbance to the control loop is once again produced.

For the reception and for the regeneration of optical signals after passing through a transmission system, digital optical receivers are known which comprise an analog input part, in which the optical signal is converted into an analog electrical signal, and a digital signal processing part in which the analog signal is regenerated into a digital data signal with a normalized amplitude and clock information. In the analog part, the received optical signal is converted into a photocurrent by means of a photodiode and amplified in a preamplifier.

SUMMARY OF THE INVENTION

The present invention is based on the object of providing a control device with a switchable bandwidth which enables the bandwidth to be switched over without disturbances to a control system arising or minimizes such disturbances.

This object is achieved according to the invention by means of a control device with a switchable bandwidth which has: an integrating element with a first capacitance, which is charged and discharged by at least one current; at least one second capacitance, which can be connected in parallel with the first capacitance via a first switch; and at least one voltage follower, via which the voltage present at the first capacitance can be fed to the second capacitance. In this case, the first switch is open if the voltage present at the first capacitance is fed to the second capacitance by means of the voltage follower. In contrast, the first switch is closed if the second capacitance is connected in parallel with the first capacitance.

The invention prevents disturbances from arising when a capacitance is supplementarily connected, by virtue of the fact that the voltage present at the first capacitance is fed to the second capacitance via the voltage follower. The current which has to be supplied by the voltage follower in this case depends directly on the current of the control, on the capacitance to be connected in, the transient recovery times and also the switchover instant. Since the second capacitance has the same voltage as the first capacitance on account of the tracking of the voltage of the first capacitance by the voltage follower, essentially no charge equalization is effected between the two capacitances in the event of a switchover. This also means that no disturbance or only a very small disturbance takes place in the control system.

The invention consequently enables a capacitance to be supplementarily connected, and thus the bandwidth of a system under consideration to be reduced, in a simple manner using a voltage follower which, before the capacitance is connected in, feeds the voltage present at the capacitance already present to the capacitance that is to be supplementarily connected, so that an essentially identical voltage is already present at the two capacitances at the switchover instant.

In this case, a first switch, via which the additional (second) capacitance can be supplementarily connected to the first capacitance is closed, only when the second capacitance is connected in parallel with the first capacitance. By contrast, said switch is opened beforehand, i.e. during the tracking of the voltage by means of the voltage follower.

In a preferred refinement of the invention, the voltage follower is connected to the second capacitance via a second switch. Said second switch is closed during the tracking of the voltage. By contrast, if the additional capacitance is supplementarily connected, the second switch is opened.

After the further capacitance has been connected in, the voltage follower is preferably deactivated, so that no additional current consumption is generated by the voltage follower. If the second capacitance is switched out in order to increase the bandwidth at a later point in time, the voltage follower can then be reactivated.

It is pointed out that the described process of connecting in further capacitances using a voltage follower can, by its nature, be effected in as many stages as desired. For this purpose, it may be provided that, instead of one additional capacitance, a plurality of additional capacitances are provided which can in each case be connected in parallel with the first capacitance via first switches and can be connected to a voltage follower via second switches. In this case, it may either be provided that the output voltage of a voltage follower can be fed to a plurality of further capacitances via second switches. On the other hand, it is also conceivable for a multiplicity of voltage followers to be provided which are respectively connected to a further capacitance.

In a preferred refinement of the invention, the voltage present at the capacitance represents the manipulated variable for an actuator of a control loop. In this case, a control takes place in the control loop to the effect that the voltage present at the first capacitance is controlled in constant fashion. In this case, the at least one current which charges and discharges the first capacitance represents a controlled variable of the control loop.

In order to clarify the terms used, the following is pointed out. Manipulated variable denotes a variable which transfers the controlling effect of a control device to a controlled system. In this case, the manipulated variable is an input variable of the controlled system and an output variable of the control device. Controlled variable denotes a process variable which is detected for the purpose of control and is fed to the control device. The controlled variable is generally assigned an actual value or an actual value can be derived from one or more controlled variables. A disturbance variable acts on the process to be controlled and leads to an alteration of the controlled variable. The controlled system is the process to be influenced or the system to be influenced. The controlled system is assigned an actuator which can be influenced by way of the manipulated variable. In this case, the actuator has the function of a correction variable.

A preferred application of the invention relates to the realization of the control device according to the invention in an optical receiver. An optical receiver serves for receiving and for regenerating optical signals after passing through an optical transmission system. In an analog part of such an optical receiver, the received optical signal is converted into an analog current signal by means of a receiving device, such as, e.g. a photodiode, and said signal is amplified in a preamplifier. There is a need for control in particular with regard to offset control, amplitude control and duty cycle control.

Accordingly, in a further aspect of the invention, the present invention provides an optical receiver circuit having a control device with a switchable bandwidth. The receiver circuit comprises a postamplifier, one of whose inputs is fed the signal of an illuminatable photodiode (or other converter device) amplified in a preamplifier and the other of whose inputs is fed the signal of a non-illuminatable photodiode (or other converter device), amplified in a further preamplifier, said non-illuminatable photodiode (or other converter device) simulating the electrical behavior of the illuminatable photodiode in the illumination-free case. The controlled system comprises one of the preamplifiers and the postamplifier, the output signal of the postamplifier being fed to the control device as controlled variable. The output of the control device, i.e. the output voltage of the control device representing a manipulated variable, controls an actuator of the controlled system. Such an actuator is a controllable current source, for example, which provides the current through the preamplifier of the controlled system.

BRIEF DESCRIPTION OF THE DRAWINGS

The invention is explained in more detail below using a plurality of exemplary embodiments with reference to the figures, in which.

DESCRIPTION OF A PLURALITY OF PREFERRED EXEMPLARY EMBODIMENTS

Figure 1:
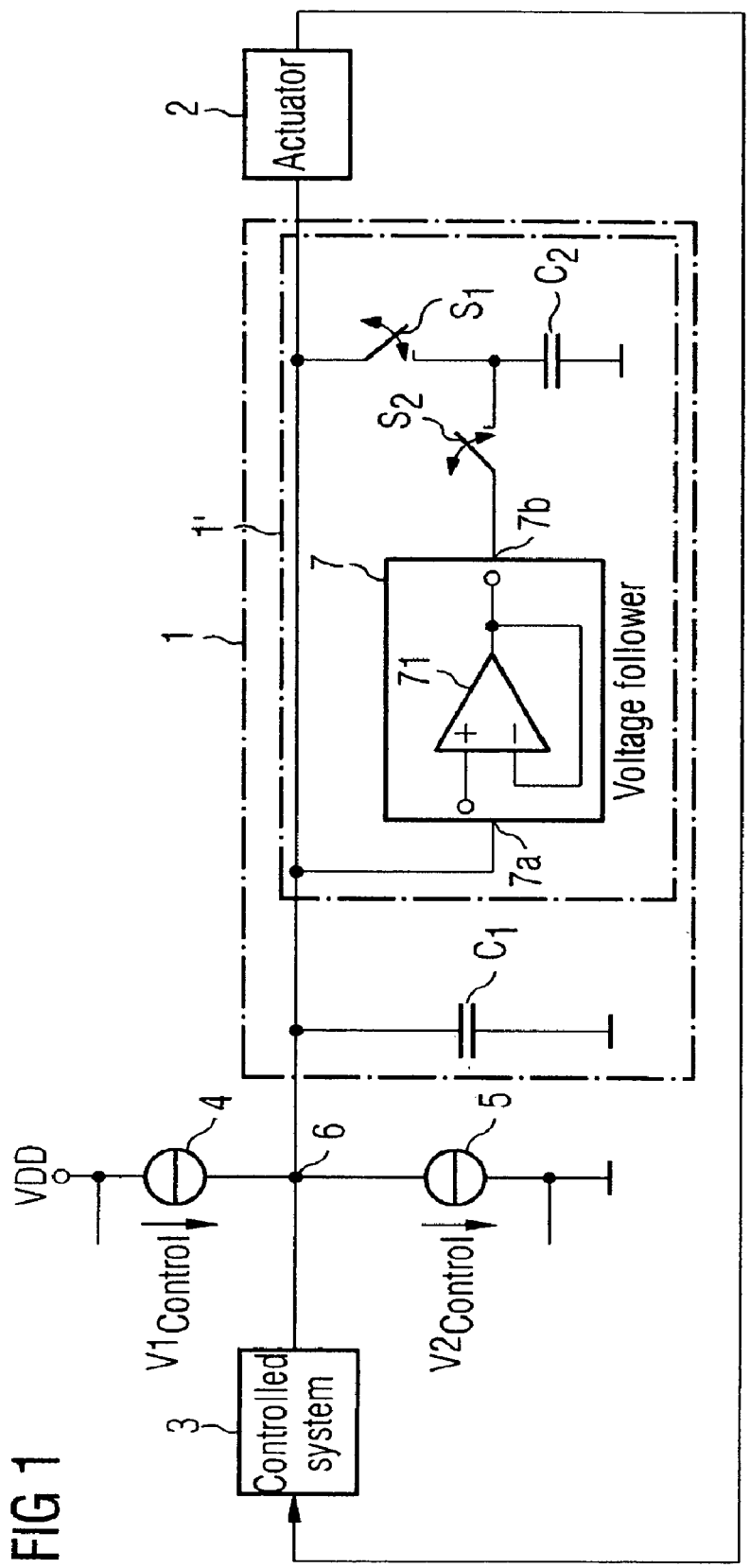
FIG. 1 schematically shows a control loop with an actuator, a controlled system and a control device, which comprises a first capacitance, a voltage follower and a second capacitance that can be supplementarily connected.

FIG. 1 shows a control loop with a switchable bandwidth. The control loop comprises a control device 1, an actuator 2 and a controlled system 3. Two control voltages $V1_{Control}$, $V2_{Control}$ or corresponding currents, which are provided by current sources 4, 5, are fed into a reference point (first reference node) 6 of the controlled system.

The control device 1 has a first capacitance C1 acting as integrator, and also an additional device 1' comprising a voltage follower 7, a second capacitance C2 and also two switches S1, S2. The voltage follower 7 has an operational amplifier 71, the output voltage of which is fed back to the inverting input of the operational amplifier 71. In the case of this circuit, the input voltage and the output voltage of the operational amplifier 71 have the same value, i.e. the output voltage follows the input voltage, which gives rise to the name "voltage follower". The system gain is one.

The first capacitance C1 is connected to the reference point 6 by its first terminal and to ground (second reference node) by its second terminal. The input 7a of the voltage follower 7 is connected to the first terminal of the first capacitance C1. The output 7b of the voltage follower 7 is connected to the second capacitance C2 via one of the switches S2. The second capacitance C2 can be connected in parallel with the first capacitance C1 via the further switch S1.

The method of operation of the control system illustrated is as follows. A clocked current is applied to the first capacitance C1 via one current source 4, and leads to a charging of the capacitance C1. At the same time, a further clocked current is applied to the capacitance C1 via the second current source 5, and leads to a discharging of the capacitance C1. The capacitance C1 acts as an integrator. If the currents provided by the two current sources 4, 5 are the inverse of one another, no discharging or charging of the capacitance C1 takes place and a stable state is present. If the currents provided by the two current sources 4, 5 are not the inverse of one another, the capacitance C1 is slowly discharged or charged.

The voltage follower 7 and the second capacitance C2 shall initially not be taken into consideration. The voltage present at the capacitance C1 represents a manipulated variable of the control system and is fed to the actuator 2. The actuator 2 influences the following controlled system 3. The control influences the two signals $V1_{Control}$, $V2_{Control}$ provided by the current sources 4, 5, so that said signals provide a controlled variable. The system is corrected if the voltage across the capacitance C1 is constant. This is achieved, as explained, when the two signals $V1_{Control}$, $V2_{Control}$ are the inverse of one another, i.e. are phase-shifted by 180° with the same amplitude and are provided with opposite signs.

As long as the second capacitance C2 is not connected in, the switch S1 is open. By contrast, the switch S2 is closed. This has the effect that the voltage present at the first capacitance C1 is tracked to the second capacitance C2 by means of the voltage follower 7. The voltage of the second capacitance C2 follows the voltage of the first capacitance C1. When the second capacitance C2 is connected in, the switch S2 is opened, whereas the switch S1 is closed. The second capacitance C2 is now connected in parallel with the first capacitance C1. This has the effect that the bandwidth of the control device and thus of the control system overall decreases. A slower control characteristic is present. The further capacitance C2 is connected in, for example, after a start time $\Delta T$ after which the system has undergone transient recovery.

A suitable controller (not illustrated) is provided for changing over the switches S1, S2. By way of example, such a controller performs a signal detect and the further capacitance C2 is connected in after the presence of such a signal detect.

On account of the voltage follower 7, the voltage at the second capacitance C2 is essentially identical to the voltage at the first capacitance C1 at the connection instant. Consequently, no charge equalization takes place between the two capacitances C1, C2 during connection. What is thereby achieved is that no disturbance is effected in the system and to the control loop.

The controlled system described in FIG. 1 may, in principle, be used in any desired context in which a switchable bandwidth is desired. A particularly preferred application is the control of signals in optical receiver circuits with an optoelectronic transducer device (e.g. a photodiode) and a preamplifier connected downstream. Such an optical receiver circuit of a digital optical receiver is illustrated in FIG. 2.

Figure 2:
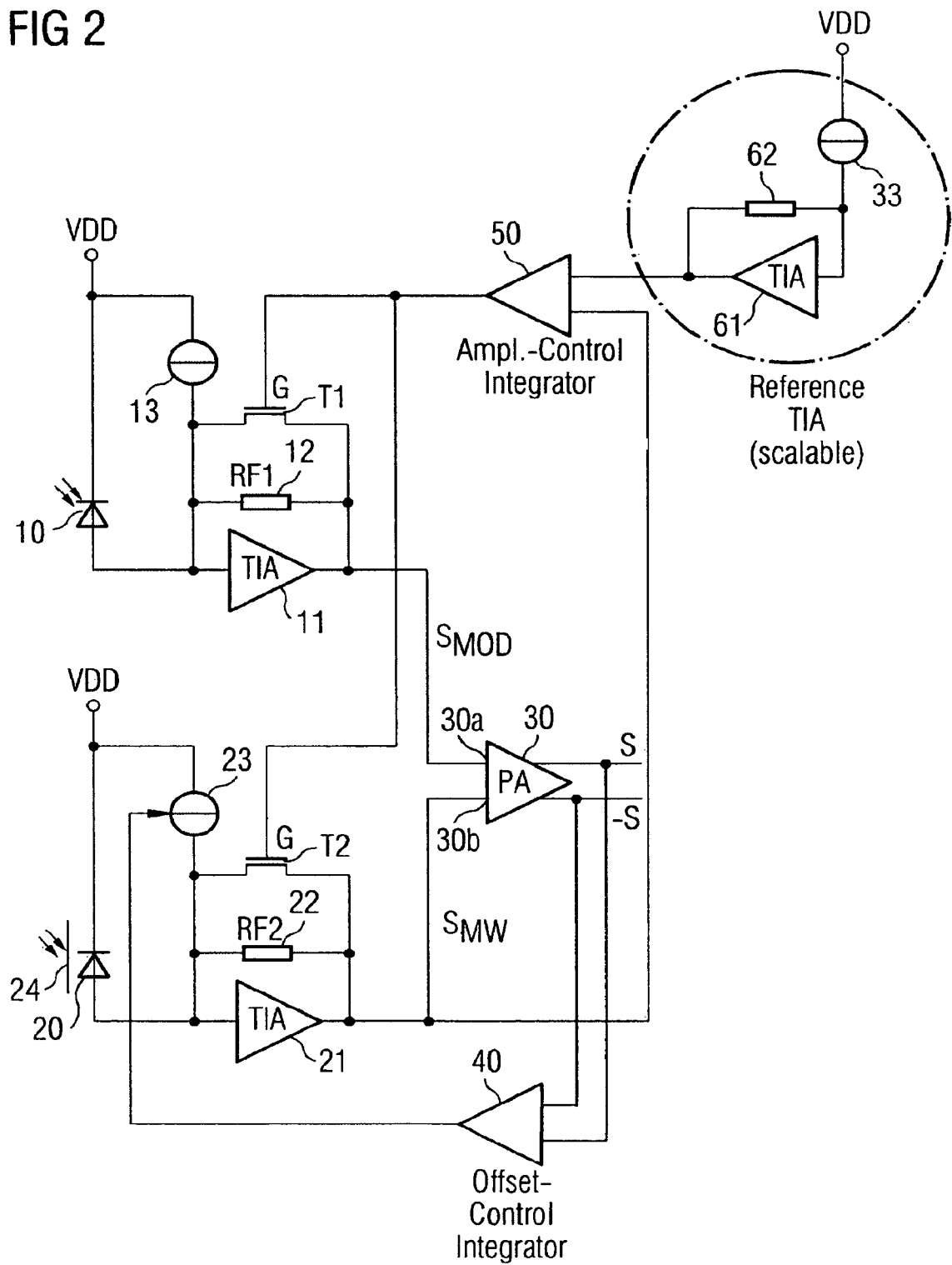
FIG. 2 shows an optical receiver circuit for converting an optical signal into an analog electrical signal.

In accordance with FIG. 2, a first optoelectronic transducer 10 in the form of a photodiode is provided, which converts an optical information signal into an electrical signal. The electrical signal is amplified in a preamplifier 11, 12 and fed to one input 30a of a postamplifier 30, which is a differential amplifier. The preamplifier is preferably a transimpedance amplifier (TIA) comprising a voltage amplifier 11 and a negative feedback resistor 12. At the input of the preamplifier, a constant current of a fixed current source 13, which provides a suitable offset at the input of the voltage amplifier 11, is superposed on the essentially rectangular-waveform output signal of the photodiode 10.

Furthermore, a field-effect transistor T1 is provided, which is connected in parallel with the negative feedback resistor 12, so that the total resistance and thus the amplitude of the output signal of the preamplifier can be set by way of the voltage present at the gate terminal of the transistor T1. A bipolar transistor may also be used instead of a field-effect transistor. The negative feedback resistor may also be set in a different way.

Furthermore, an essentially identical circuit part having a photodiode 20, a voltage amplifier 21, a negative feedback resistor 22, a current source 23 and a transistor T2 is provided. In the case of this circuit part, however, the photodiode 20 is covered by a screen 24 or the like. A "dummy photodiode" is involved, which electrically simulates the electrical behavior of the "seeing" photodiode 10 in the illumination-free case. In this way, radiofrequency interference can be suppressed to the greatest possible extent. A further difference is that the current source 23 is not constant like the upper current source 13. Rather, a controllable current source 13 is involved, which receives a control signal from an offset control integrator 40, as will be explained.

The output signal $S_{MOD}$ of the upper preamplifier 11 and the output signal $S_{MW}$ of the lower preamplifier 21 are fed to the two inputs 30a, 30b of the postamplifier 30. Since no optical signal is detected by the photodiode 20, the signal $S_{MW}$ present at the input 30b has a constant value, apart from interference frequencies. By contrast, the signal $S_{MOD}$ represents the information signal modulated in rectangular-waveform fashion.

The intention, then, is to seek to feed a "correction signal" $S_{MW}$ into the lower input 30b of the postamplifier 30 for the offset correction of the modulated signal $S_{MOD}$ which is output by the photodiode 10 and amplified in the preamplifier 11, the magnitude of which "correction signal" represents precisely 50% of the signal swing of the signal $S_{MOD}$ at the other input 30a of the postamplifier 30. At its output, the postamplifier 30 provides an offset-corrected output signal S corresponding to the optical signal of the photodiode 10 and an inverted signal −S with respect to said output signal. A differential driving of the downstream components then takes place.

In order to ensure that the level $S_{MW}$ at the output of the preamplifier 21 is precisely equal to the mean value of the signal swing of the data stream signal $S_{MOD}$, a control is effected. This is illustrated schematically by the offset control integrator 40. In a manner dependent on the differential output signal S, −S of the postamplifier 30, the current source 23 is controlled in such a way that the signal $S_{MW}$ present at one input 30b of the postamplifier 30 is precisely 50% of the signal swing of the useful signal. In this case, two signals S, −S which are exactly the inverse of one another are generated at the output of the postamplifier 30. Otherwise, the output signal is distorted. Downstream components are driven differentially, i.e. the downstream components in each case evaluate the difference between two input signals. Since the signals are the inverse of one another, a doubled amplitude can be evaluated by the downstream components. This reduces the susceptibility to interference and increases the stability.

The control device 1 of FIG. 1 is integrated into the offset control integrator 40. In this case, the controllable current source 23 corresponds to the actuator 2. The controlled system 3 is formed by the preamplifier 21 and the postamplifier 30. The signals $V1_{Control}$ and $V2_{Control}$ of FIG. 1 are provided by the two output signals S, −S of the postamplifier 30. These signals S, −S are applied to the capacitance C1 and, after the capacitance C2 has been connected in, also the capacitance C2. The controlled system is corrected for the case where the two signals S, −S present at the reference point 6 are formed in completely differential fashion. For this case, the voltage at the capacitance C1, C2 is constant. If this is not the case, the voltage at the capacitance changes and this change in voltage is transferred via the actuator 2 or the controllable current source 23 to the control loop until the signals S, −S at the output of the postamplifier 30 are the inverse of one another or the constant level at the output of the preamplifier 21 is precisely 50% of the signal swing of the useful signal.

Amplitude control furthermore takes place in the circuit of FIG. 2. Thus, the constant output value of the voltage amplifier 21 is compared with a reference value in a further integrator 50, said reference value being provided by means of a further current source 33 and a transimpedance amplifier with elements 61, 62. The voltage at the gate terminal of the respective transistor T1, T2 is changed depending on this comparison, as a result of which the resistance of the negative feedback resistor of the transimpedance amplifier changes, which leads to an altered amplitude of the useful signal.

It is pointed out that the control device according to the invention, in accordance with FIG. 1, has been described merely by way of example, in the context of the receiver circuit of FIG. 2. In principle, the control device can be used wherever switchable bandwidths are required.

We claim:

1. A control device with a switchable bandwidth, the control device comprising:
    an input coupled to an optical receiver circuit for receiving a controlled variable associated with the optical receiver circuit;
    an output coupled to an actuator associated with the optical receiver circuit for providing an output signal;
    an integrating element coupled to the input and including a first capacitance, which is charged and discharged by at least one current,
    at least one second capacitance, which is selectively coupled to the output and connected in parallel with the first capacitance via a first switch,
    at least one voltage follower, via which the voltage present at the first capacitance is selectively fed to the second capacitance,
    means for opening the first switch when the voltage present at the first capacitance is fed to the second capacitance by the voltage follower, and
    means for closing the first switch to connect the second capacitance in parallel with the first capacitance.

2. The control device as claimed in claim 1, further comprising a second switch provided between the voltage follower and the second capacitance.

3. The control device as claimed in claim 2, wherein the first switch and the second switch are simultaneously opened and closed, respectively, to feed the voltage present at the first capacitance to the second capacitance by the voltage follower.

4. The control device as claimed in claim 2, wherein the first switch and the second switch are simultaneously closed and opened, respectively, to connect the second capacitance in parallel with the first capacitance.

5. The control device as claimed in claim 1, wherein the first capacitance is charged with a first clocked current and being discharged with a second clocked current.

6. The control device as claimed in claim 1, further comprising means for deactivating the voltage follower while the second capacitance is connected in parallel with the first capacitance.

7. The control device as claimed in claim 1, wherein the voltage present at the first capacitance is a manipulated variable for the actuator of a control loop associated with the optical receiver circuit, in which a control takes place with the effect that the voltage present at the first capacitance is controlled in constant fashion, and a current applied to the first capacitance is the controlled variable of the control loop.

8. A control device comprising:
    an input coupled to an optical receiver circuit for receiving a controlled variable associated with the optical receiver circuit;
    an output coupled to an actuator associated with the optical receiver circuit for providing an output signal;
    an integrating element coupled to the input and including a first capacitance having a first terminal connected to a first reference node and a second terminal connected to a second reference node;
    a first switch having a first terminal connected to the first reference node and a second terminal;
    a second capacitance selectively coupled to the output and having a first terminal connected to the second terminal of the first switch, and a second terminal connected to the second reference node;
    a voltage follower connected to the first reference node for generating an output voltage that is equal to a voltage present on the first terminal of the first capacitance; and
    means for opening the first switch and applying the voltage follower output voltage on the first terminal of the second capacitance during a first time period, and for closing the first switch to connect the second capacitance to the first capacitance and thereby reduce the bandwidth of the control device and discontinuing the application of the voltage follower output voltage on the first terminal of the second capacitance during a second time period.

9. The control device as claimed in claim 8, further comprising a second switch having a first terminal connected to an output terminal of the voltage follower, and a second terminal connected to the first terminal of the second capacitance.

10. The control device as claimed in claim 9, wherein said means for applying the voltage follower output voltage during the first time period closes the second switch, thereby causing the second switch to pass the output voltage generated by the voltage follower to the first terminal of the second capacitance during the first time period.

11. The control device as claimed in claim 9, wherein said means for discontinuing the application of the voltage follower output voltage during the second time period opens the second switch, thereby disconnecting the voltage follower from the first terminal of the second capacitance during the second time period.

12. The control device as claimed in claim 8, wherein said means for discontinuing the application of the voltage follower output voltage deactivates the voltage follower during the second time period.

* * * * *